US011777998B2

(12) United States Patent
Carotenuto et al.

(10) Patent No.: US 11,777,998 B2
(45) Date of Patent: Oct. 3, 2023

(54) SECURE LAWFUL INTERCEPTION IN NETWORK ELEMENTS

(71) Applicant: TELEFONAKTIEBOLAGET LM ERICSSON (PUBL), Stockholm (SE)

(72) Inventors: Claudio Carotenuto, Nocera Inferiore (IT); Elio Barese, Naples (IT); Paolo D'Amora, Gragnano (IT); Francesca Marfia, Pagani (IT); Vincenzo Paparo, Torre Annunziata (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 358 days.

(21) Appl. No.: 17/281,791

(22) PCT Filed: Oct. 4, 2018

(86) PCT No.: PCT/SE2018/051015
§ 371 (c)(1),
(2) Date: Mar. 31, 2021

(87) PCT Pub. No.: WO2020/071971
PCT Pub. Date: Apr. 9, 2020

(65) Prior Publication Data
US 2021/0385256 A1    Dec. 9, 2021

(51) Int. Cl.
*H04L 9/40* (2022.01)
(52) U.S. Cl.
CPC ................... *H04L 63/306* (2013.01)
(58) Field of Classification Search
CPC ....... H04L 63/20; H04L 63/30; H04L 63/302; H04L 63/306
See application file for complete search history.

(56) References Cited

U.S. PATENT DOCUMENTS 7,577,422 B2 * 8/2009 Laiho ..................... H04Q 11/04
455/410
8,914,021 B2 * 12/2014 Billau ..................... H04W 24/00
455/445
(Continued)

FOREIGN PATENT DOCUMENTS

EP            1993256 A1    11/2008
WO      2016060597 A1     4/2016

OTHER PUBLICATIONS

ES 201 158 V1.1.2, "Telecommunications security; Lawful Interception (LI); Requirements for network functions," ETSI Standard, European Telecommunications Standards Institute (ETSI), May 1998, 31 pages, vol. SEC.
(Continued)

*Primary Examiner* — Hosuk Song
(74) *Attorney, Agent, or Firm* — PATENT PORTFOLIO BUILDERS PLLC

(57) ABSTRACT

A mechanism is provided that enables hiding identities of a target subscriber that is to be subject of lawful interception, LI, when the intercept access point, IAP, is outside the network operator part of the LI domain. Monitoring of data traffic such as over-the-top, OTT, services is enabled while at the same time hiding LI target identities to a network element, NE, containing the IAP. A secure memory area in the NE is dedicated to the LI functionality necessary to intercept and report interception data to the operator part of the LI domain. The interface between the NE and the operator part of the LI domain is the use of a secure injection channel via which the necessary LI software and target information are conveyed between the NE and the operator part of the LI domain.

10 Claims, 7 Drawing Sheets

(56) References Cited

U.S. PATENT DOCUMENTS

| | | | | |
|---|---|---|---|---|
| 10,420,005 B2* | 9/2019 | Dinan | ................. | H04W 40/00 |
| 11,013,015 B2* | 5/2021 | Loehr | ................. | H04W 72/51 |
| 11,042,719 B2* | 6/2021 | Rodriguez | ............ | H04L 9/3213 |
| 11,050,670 B2* | 6/2021 | Frydman | ................. | H04L 47/22 |
| 11,382,008 B2* | 7/2022 | Feldman | ............ | H04L 65/1104 |
| 2014/0286177 A1 | 9/2014 | Ni et al. | | |
| 2018/0176264 A1* | 6/2018 | Lindgren | ............ | H04W 12/037 |

OTHER PUBLICATIONS

ETSI TS 103 221-1 V1.1.1, "Lawful Interception (LI); Part 1:Internal Network Interface XI for Lawful Interception," ETSI Technical Specification, European Telecommunications Standards Institute, Oct. 2017, pp. 1-36, vol. LI.

International Search Report / Written Opinion dated Jun. 14, 2019 in related/corresponding PCT Application No. PCT/SE2018/051015.

* cited by examiner

SECURE LAWFUL INTERCEPTION IN NETWORK ELEMENTS

TECHNICAL FIELD

Embodiments herein relate to methods of managing information for controlling lawful interception (LI) in a communication network, a network element, a computer system as well as computer programs and carriers of such computer programs.

BACKGROUND

Emerging and future digital communication systems and networks are characterized by versatility, capacity and speed that vastly surpass the versatility, capacity and speed of prior art systems and networks. Moreover, communication service providers in the so-called $5^{th}$ generation (5G) network scenario are not restricted to traditional telecommunication operators, but include many other providers taking advantage of the inherent versatility, capacity and speed of the systems and networks. As a consequence of this evolution, in the 5G network scenario, there will be a great opportunity to develop and dynamically deploy new applications, e.g. from Over-The-Top (OTT) service and application providers and/or in Internet-Of-Things (IoT) scenarios. As for previous generations of applications and services, such new applications or services will be subject to regulations in terms of lawful interception (LI).

A LI system is a security system used by communication service providers (CSP) or network operators to collect and provide a lawful enforcement agency (LEA) with intercepted call content of communications (CC) and intercept related information (IRI) associated with a target subscriber.

As schematically illustrated in FIG. 1a, in the prior art, when a LEA is interested in monitoring a target subscriber, the LI system configures an intercept access point (IAP) to capture IRI and CC according to a warrant. A warrant is a legal authorization to perform an interception. Once the IAP is correctly configured with the identity of the target to intercept it will send CC and IRI to the LI system, where the data will be mediated and delivered to the LEA.

The LI system is connected to the LEA via standardized handover interfaces HI1, HI2 and HI3 and it is connected to the IAP via proprietary interfaces X1, X2 and X3. X1 is used by LI system to manage the intercept function in the IAP; X2 is used by IAP to send IRI to LI system; X3 is by IAP to send CC to LI system; HI1 is used by LEA to manage the intercept function in the LI system; HI2 is a standardized interface used by LI system to send IRI to LEA; and HI3 is a standardized interface used by LI system to send CC to LEA.

Nowadays, CSP's are overwhelmed by OTT applications and services. Such applications services are not classified as traditional telecom service providers, and their rapid growth has raised a lot of issues relating to regulatory imbalances and security concerns. As schematically illustrated in FIG. 1b, an OTT application is not managed by the network operator responsible for the whole LI solution. Furthermore, the LI system must provide the IAP (owned by the OTT provider) with the identity of the target subscriber that is to be subject of LI. Also, due to the fact that an OTT player may offer worldwide services or applications, an IAP and information about a target subscriber to intercept may reside in different countries. In the prior art it is not possible to prevent an OTT provider from accessing LI target information due to the simple fact that the IAP is outside the LI domain of the network operator.

SUMMARY

In view of the above, an object of the present disclosure is to overcome drawbacks related to handling LI information is a context where an IAP is outside the LI domain of the network operator. This object is achieved in a first aspect by a method performed by a network element (NE) in a communication network.

The method of the first aspect comprises obtaining, from a LI function such as an administrative function (ADMF), a lawful interception software module (LI-SWM) that is configured to perform LI of user traffic handled by the NE. The LI-SWM is stored in a memory area that is protected from unauthorized access, and the LI-SWM is then executed, comprising LI of user traffic handled by the NE.

The method may further comprise obtaining, from the LI function, target information which is stored in the protected memory area. The executing of the LI-SWM then comprises utilization of the target information.

In various embodiments, any of the obtaining of the LI-SWM and the obtaining of the target information may comprise reception via an injection channel between the LI function and the NE.

In a second aspect, the object of the present disclosure is achieved by a method performed by a LI function, such as an ADMF, in a communication network. This method comprises providing to a NE, a LI-SWM that is configured to perform LI of user traffic handled by the NE.

The method may further comprise providing target information to the NE.

In various embodiments, any of the providing of the LI-SWM and the providing of the target information may comprise transmission via an injection channel between the LI function and the NE.

As will be exemplified below, referring to both aspects, communication in the injection channel between the NE and the LI function may be performed via an X1 interface.

In other words, a mechanism is provided that enables hiding identities of a target subscriber that is to be subject of LI, when the IAP is outside the network operator part of the LI domain. That is, monitoring of data traffic such as OTT services is enabled while at the same time hiding LI target identities to the network element. A secure memory area in the NE is dedicated to the LI functionality necessary to intercept and report IRI and CC to the operator part of the LI domain. The interface between the NE and the operator part of the LI domain is the use of a secure injection channel via which the necessary LI software and target information are conveyed between the NE and the operator part of the LI domain.

Such a mechanism that hides LI target identities is advantageous in several ways. For example, it addresses serious security concerns raised from the recent growth of OTT services emanating from the on-going realization and implementation of various 5G scenarios where the privacy of users and the need for a provider of NEs to have a trusted solution are crucial. Moreover, such a mechanism will avoid causing delays in network deployment, since IAP vendors will not need to implement proprietary X interfaces in case the Li mechanism of the present disclosure becomes part of a standard.

In a further aspect there is provided a network element device comprising a processor and a memory. The memory contains instructions executable by the processor whereby the network element device is operative to perform a method as summarized above in connection with the first aspect.

In yet a further aspect there is provided a computer system comprising a plurality of server blades. Each server blade comprises a processor and a memory, the memory containing instructions executable by the processor whereby the computer system is operative to perform a method as summarized above in connection with the second aspect.

In yet a further aspect there is provided a computer program comprising instructions which, when executed on at least one processor in a network element device, cause the network element device to carry out the method as summarized above in connection with the first aspect. A carrier is provided in yet a further aspect, which comprises the computer program, wherein the carrier is one of an electronic signal, an optical signal, a radio signal and a computer readable storage medium.

In yet a further aspect there is provided a computer program comprising instructions which, when executed on at least one processor in a server blade in a computer system, cause the computer system to carry out the method as summarized above in connection with the second aspect. A carrier is provided in yet a further aspect, which comprises the computer program, wherein the carrier is one of an electronic signal, an optical signal, a radio signal and a computer readable storage medium.

These further aspects and embodiments of these further aspects provide the same effects and advantages as summarized above in connection with the method of the first and second aspect.

DETAILED DESCRIPTION

Figure 1A:
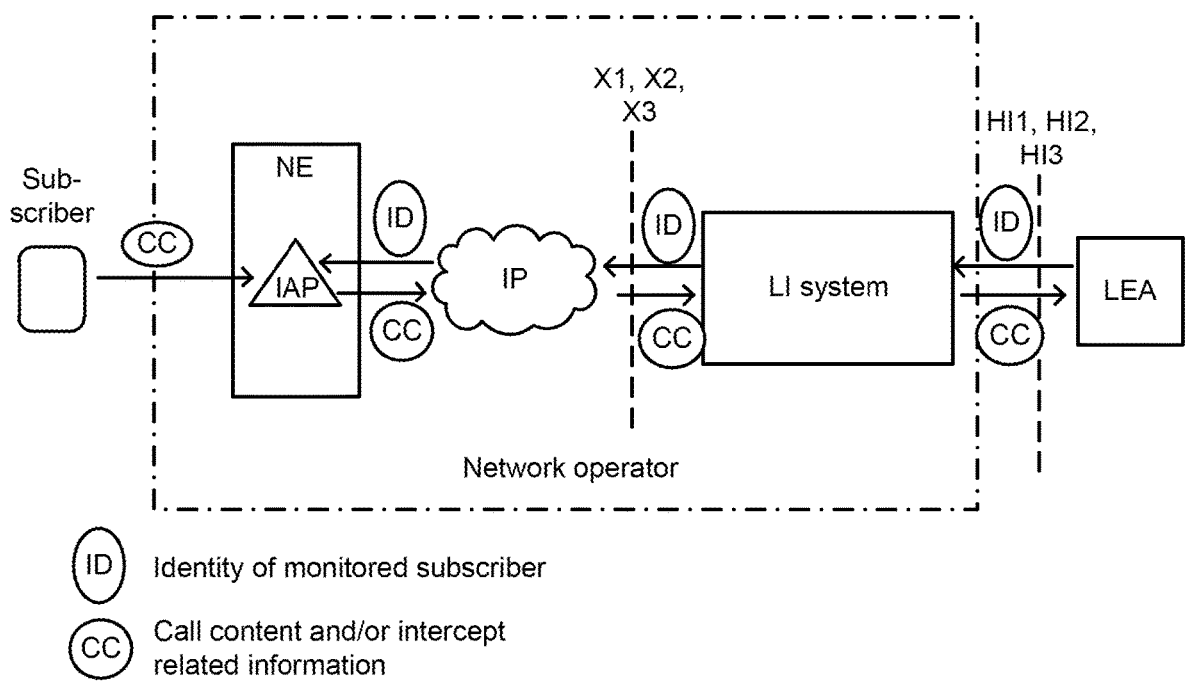
FIGS. 1a and 1b are schematically illustrated block diagrams of prior art LI systems.
Figure 1B:
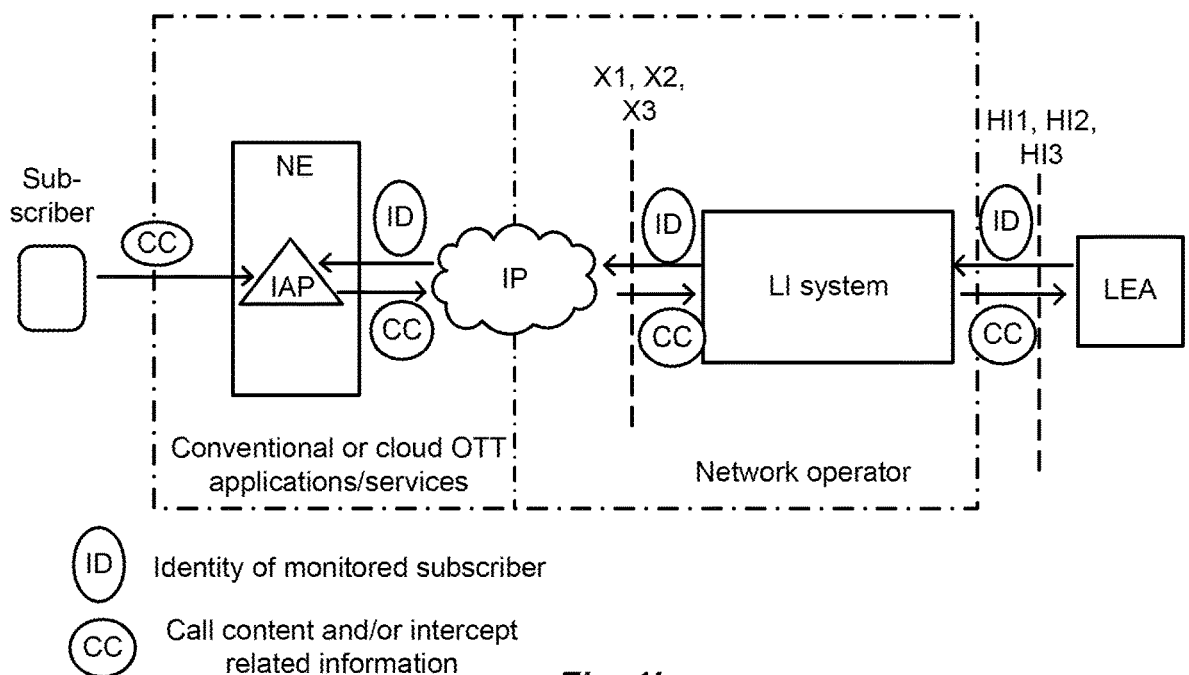
Figure 2:
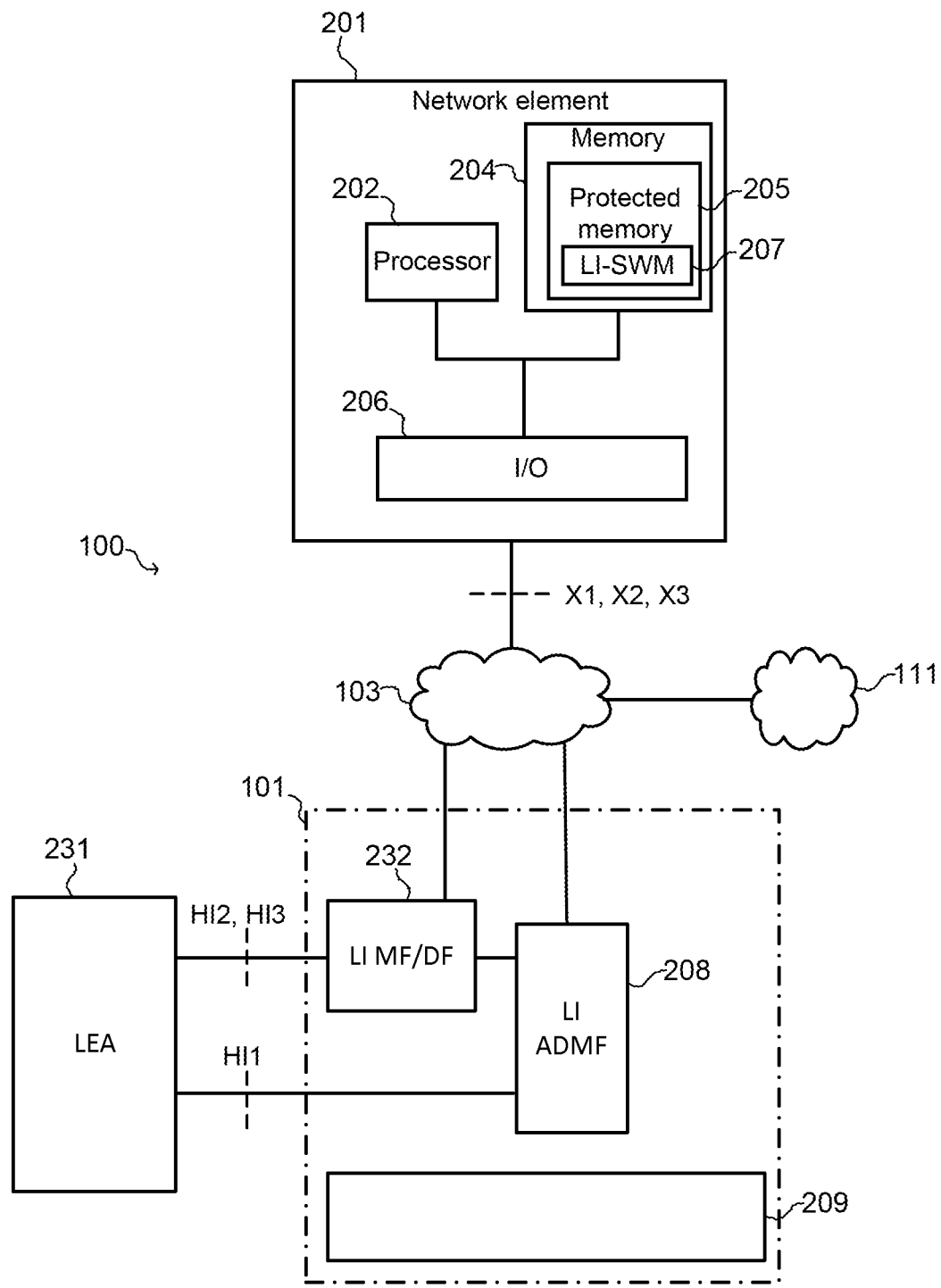
FIG. 2 is a schematically illustrated block diagram of a LI system.

Examples of a mechanism as summarized above will now be described with reference to FIGS. 2 to 6. FIG. 2 schematically illustrates a first functional representation of a communication network 100 comprising an operator network 101 and an access network 103 to which a network element 201 is connected. Another network 111 with which the NE 201 may communicate is also illustrated. The NE 201 comprises a processor 202, a memory 204 and input/output functionality 206. The memory 204 comprises all necessary software for controlling the NE 201 to operate as desired in connection with the operator network 101 and operate to realize embodiments of methods to be described below. For example, during communication via the operator network 101 or during communication with entities in the other network 111, user traffic is generated that may be intercepted in the form of CC and IRI. A protected memory area 205 may form part of the memory 204 and host, i.e. contain, a software module 207 that performs LI functions related to CC and IRI. The skilled person will readily utilize appropriate security mechanisms to realize the protected memory area 207, e.g. on a generic host such as a virtual machine or docker with limited user access and based on secure communication protocols.

The access network may be of any network type that may connect to the operator network 101 using internet protocol (IP) communication.

As the skilled person will realize, communication performed by the NE 201 is enabled by several functional units in both the access network 103 and the operator network 101. For the sake of clarity of description, such functional units are not illustrated in full but only schematically represented and exemplified by a network function 209 that, in a 4G context, may be a mobility management entity (MME), a serving gateway (S-GW), a packet data network gateway (P-GW) etc. In a 5G context, the network function may, e.g., be in the form of a policy control function (PCF), a user data management function (UDM), a LI control function (LICF) or a session management function (SMF). The operator network 101 also comprises a LI ADMF 208 and a LI MF/DF function 232 that connects to a LEA 231. The MF/DF 232 is configured to handle IRI and CC received from the NE 135 and provide the IRI and CC to the LEA 231. The LEA 131 manages a LEMF 236, which receives IRI and CC from the MF/DF 232.

Turning now to FIGS. 3a-c, 4 and 5a-c, and with continued reference to FIG. 2, embodiments of methods related to LI involving the NE 201 will now be described in some more detail.

A first set of embodiments of a method in the communication network 100 comprises a number of actions performed by the NE 201 introduced and described above in connection with FIG. 2:

Action 301
The NE 201 obtains, from a LI function a lawful interception software module (LI-SWM) 207. The LI-SWM 207 is configured to perform LI of user traffic handled by the NE 201. The LI function may, e.g., be in the form of the ADMF 208.

Action 303
The LI-SWM 207 is stored in a memory area 205 that is protected from unauthorized access.

Action 305
The LI-SWM 207 is executed, comprising LI of user traffic handled by the NE 201.

Figure 3A:
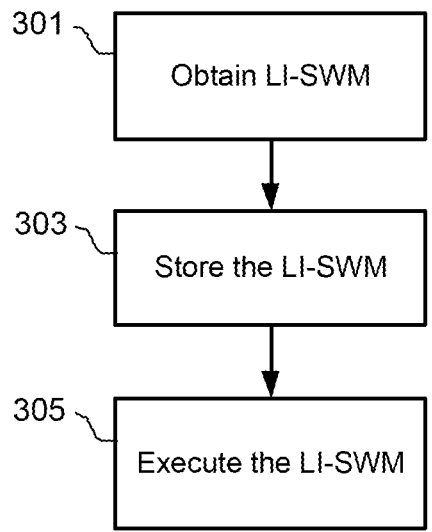
FIGS. 3a-c are flowcharts of methods.
Figure 3B:
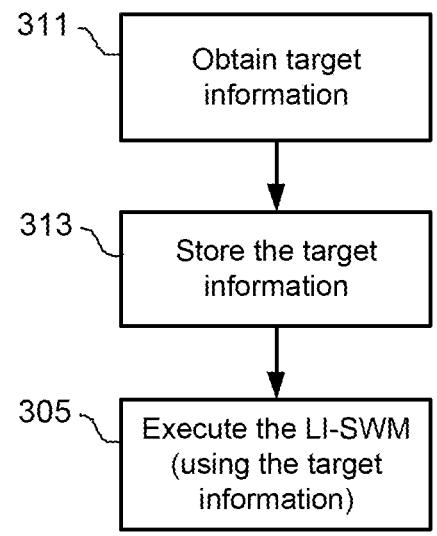

As illustrated in FIG. 3b, some embodiments comprise further actions:

Action 311
Target information is obtained from the LI function.

Action 313
The target information is stored in the protected memory area 205, for example within the LI-SWM 207 that is hosted in the protected memory area 205.

In such embodiments, the executing, in action 305, of the LI-SWM 207 comprises utilization of the stored target information.

Figure 3C:
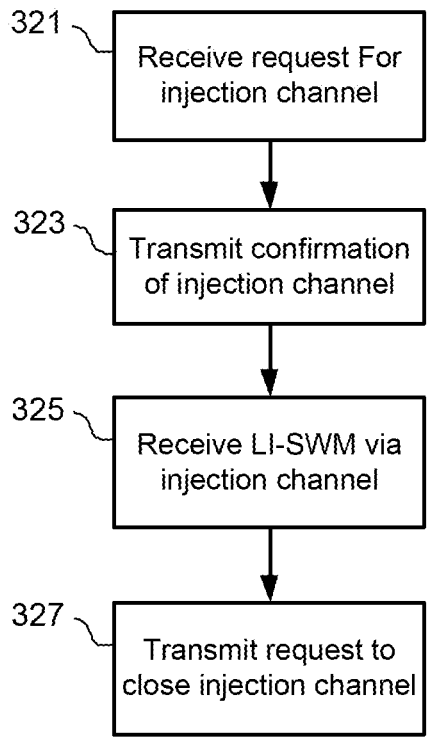

In various embodiments, any of the obtaining, in action 301, of the LI-SWM 207 and the obtaining, in action 311, of the target information may comprise reception via an injection channel between the LI function and the NE 201. As illustrated in FIG. 3c, such embodiments may comprise a sequence of actions as follows:

Action 321
A request is received, from the LI function, for opening an injection channel between the LI function and the NE 201.

Action 323
A confirmation is transmitted, to the LI function, that the injection channel is open.

Action 325

Any of the LI-SWM 207 and the target information is received via the injection channel.

Action 327

A request is transmitted, to the LI function, to close the injection channel.

Although not illustrated, some embodiments include further detailed actions involving handshaking and retry mechanisms between the communicating entities.

The receiving in action 321 and action 325 and the transmitting in action 323 and action 327 may be performed via an X1 interface between the LI function and the NE 201.

Figure 4:
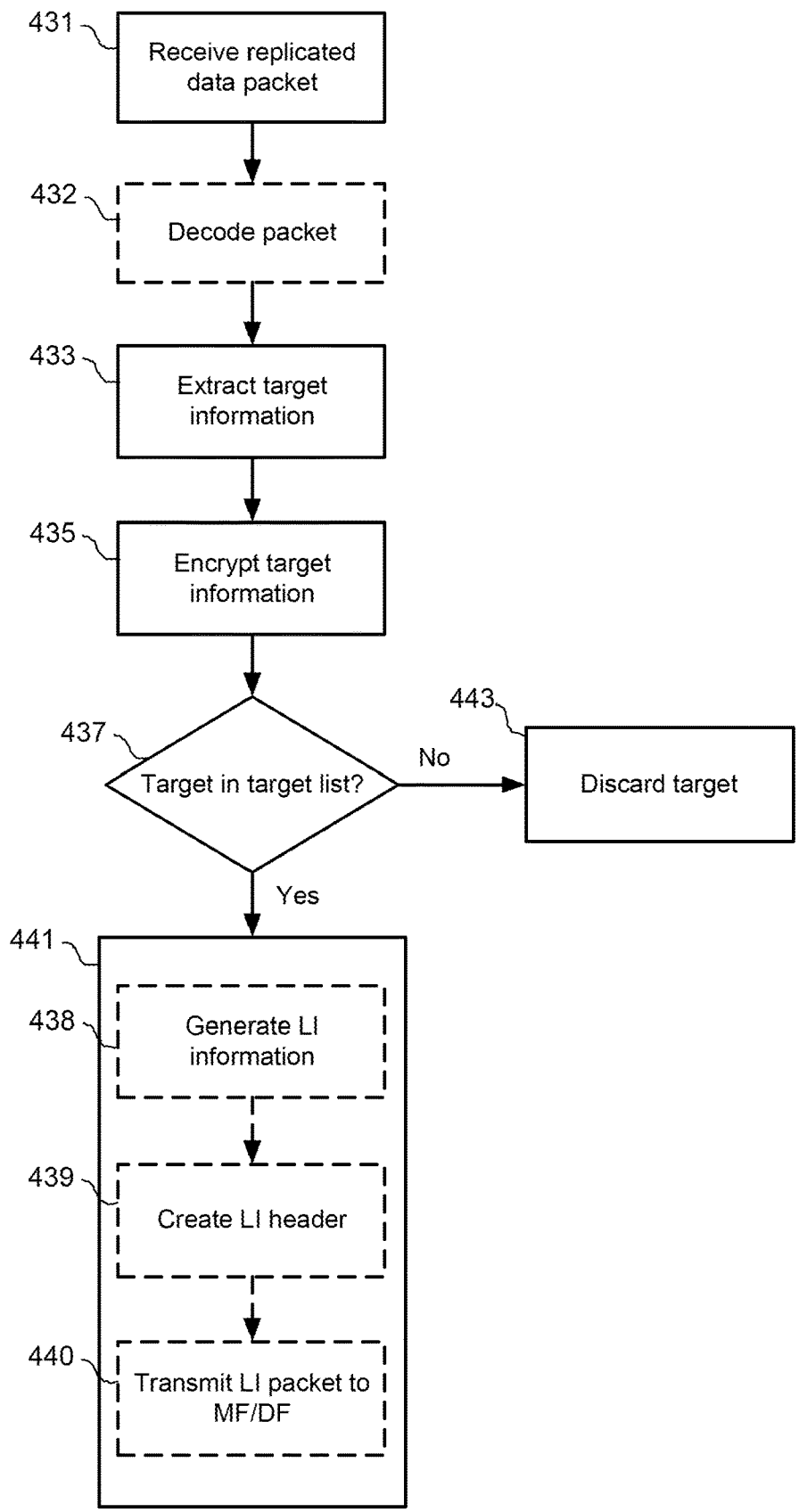
FIG. 4 is a flowchart of a method.

A detailed example of the execution, in action 305, of the LI-SWM 207 comprises a number of actions as illustrated in FIG. 4, where the stored target information is in the form of stored encrypted target information.

Action 431

A replicated data traffic packet is received from network element level data traffic that the NE 201 handles. As illustrated, by an action 432, the received data traffic packet may also be subject of appropriate decoding.

Action 433

Target information is extracted from the replicated data traffic packet.

Action 435

The extracted target information is encrypted.

Action 437

Comparison is made of the extracted and encrypted target information with the stored encrypted target information.

Action 441

If the comparing in action 437 results in a match between the extracted and encrypted target information with the stored encrypted target information. The replicated data traffic packet is conveyed to the LI MF/DF 232.

As exemplified in FIG. 4, the conveying action 441 comprises appropriate formatting of the LI information to be transmitted to the MF/DF 232. For example, as action 438 illustrates, the LI information may comprise correlation numbers, timestamps and sequence numbers. This information may then, as illustrated in action 439, be formatted into a LI header that prepends the intercepted data, e.g. the CC and IRI. Action 440 then illustrates the actual transmission of the formatted LI information to the MF/DF 232.

Action 443

If the comparing in action 437 results in a mismatch between the extracted and encrypted target information with the stored encrypted target information, the replicated data traffic packet is discarded.

Figure 5A:
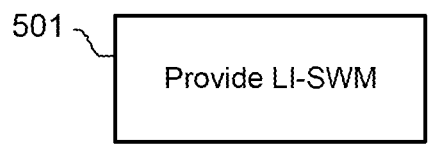
FIGS. 5a-c are flowcharts of methods.
Figure 5B:
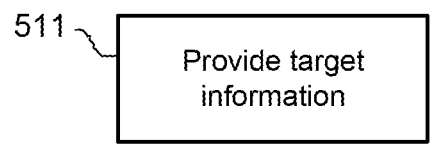
Figure 5C:
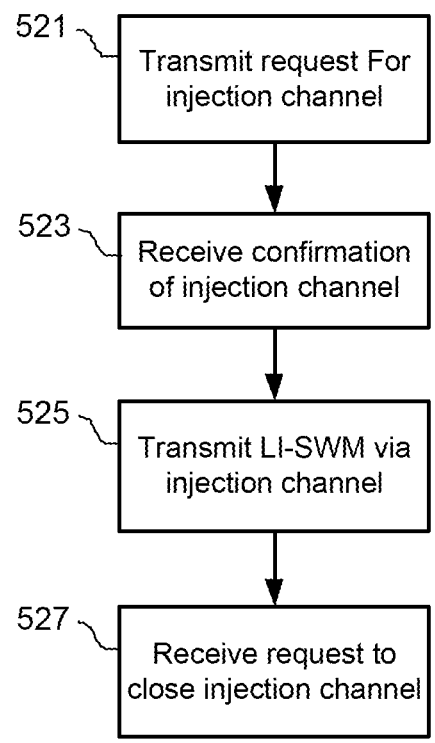

Turning now to FIGS. 5a-c, embodiments of methods performed by the LI function, e.g. the ADMF, when co-operating with the NE 201 will be described in terms of a number of actions. In FIG. 5a, the LI function is illustrated to perform a method in the communication network 100 that correspond to the embodiments illustrated in FIG. 3a performed by the NE 201.

Action 501

A LI-SWM 207 is provided to the NE 201. The LI-SWM is configured to perform LI of user traffic handled by the NE 201.

In FIG. 5b, the LI function is illustrated to perform a method in the communication network 100 that correspond to the embodiments illustrated in FIG. 3b performed by the NE 201.

Action 511

Target information is provided to the NE 201.

In various embodiments, any of the provision, in action 501, of the LI-SWM 207 and the providing, in action 511, of the target information may comprise transmission via an injection channel between the LI function and the NE 201. In FIG. 5c, the LI function is illustrated to perform a method in the communication network 100 that correspond to the embodiments illustrated in FIG. 3c performed by the NE 201.

Action 521

A request for opening an injection channel between the LI function and the NE 201 is transmitted to the NE 201.

Action 523

A confirmation that the injection channel is open is received from the NE 201.

Action 525

Any of the LI-SWM 207 and the target information is transmitted via the injection channel.

Action 527

A request to close the injection channel is received from the NE 201.

Although not illustrated, some embodiments include further detailed actions involving handshaking and retry mechanisms between the communicating entities.

The transmission in action 521 and action 525 and the reception in action 523 and action 527 may be performed via an X1 interface between the LI function and the NE 201.

Figure 6A:
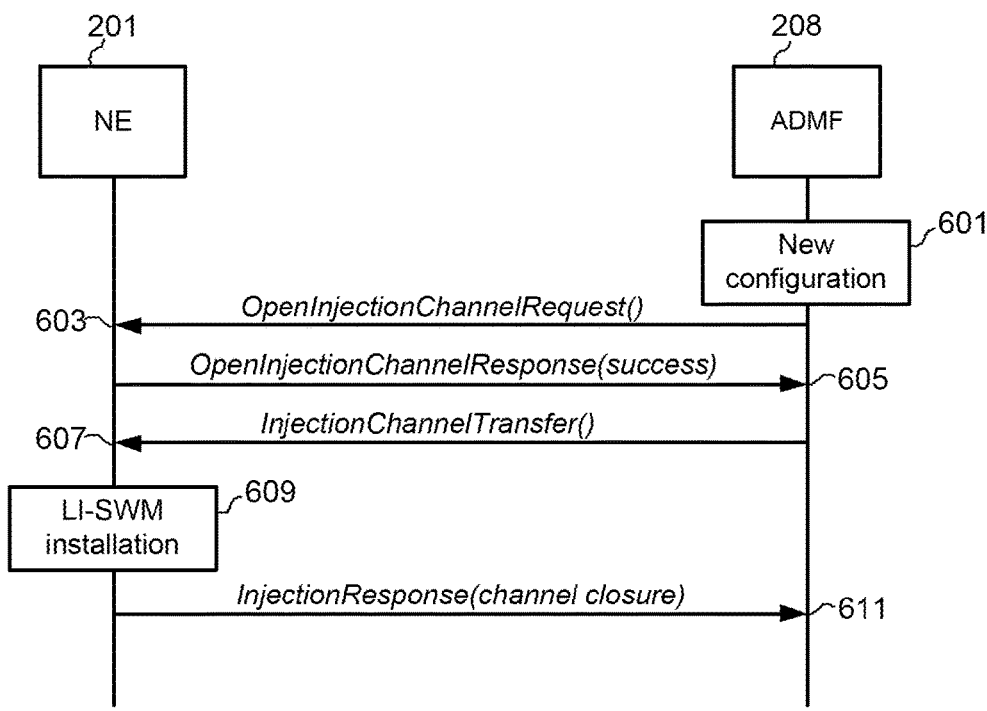
FIGS. 6a and 6b are signaling diagrams,
FIG. 7 schematically illustrates a network element,
FIG. 8 schematically illustrates a network element and
FIG. 9 schematically illustrates a computer system.
Figure 6B:
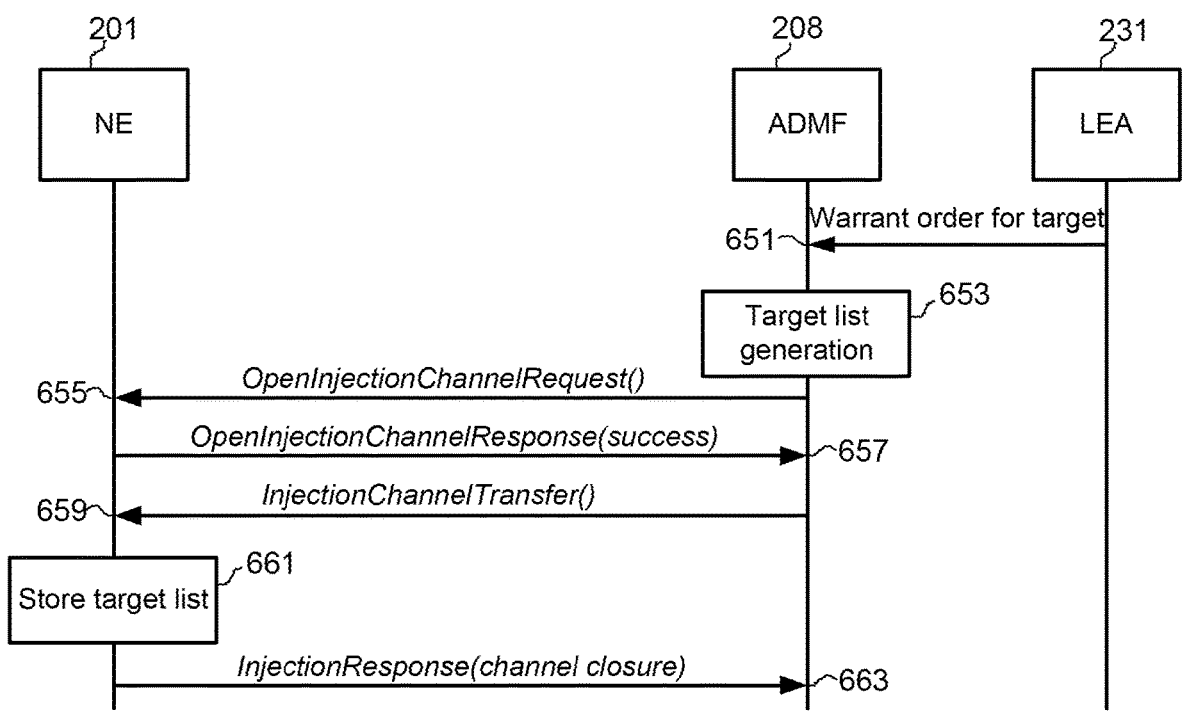

Detailed example embodiments of the use of an injection channel, e.g. using an X1 interface or another appropriate interface, comprises transmission of a number of actions and messages as illustrated in FIGS. 6a and FIG. 6b. Continued reference are made to FIGS. 1 to 5.

FIG. 6a illustrates an example of the use of an injection channel to transfer the LI-SWM 207 from the ADMF 208 to the NE 201.

Action 601

The ADMF 208 performs a configuration of necessary parameters for the operation of the LI associated with the NE 201, such as addresses, port numbers, usernames etc.

Message 603

Open InjectionChannelRequest( ) is transmitted from the ADMF 208 to the NE 201.

Message 605

OpenInjectionChannelResponse(success) is transmitted from the NE 201 to the ADMF 208.

Message 607

InjectionChannelTransfer( ), i.e. an injection message containing the LI-SWM 207, is transmitted from the ADMF 208 to the NE 201.

Action 609

The LI-SWM 207 that is received is stored in the protected memory area 205.

Message 611

InjectionResponse(channel closure) is transmitted from the NE 201 to the ADMF 208.

As noted above, although not illustrated, some embodiments include further detailed actions involving handshaking and retry mechanisms between the communicating entities.

FIG. 6b illustrates an example of the use of an injection channel to transfer new target information, or update already existing target information, from the ADMF 208 to the NE 201. As indicated in FIG. 6b, it is actually the functionality of the already injected LI-SWM that participates in the sequence of messages and actions illustrated in FIG. 6b.

Message 651

The LEA 231 provides target information to the ADMF 208 by means of transmission of a so-called warrant.

Action 653

The ADMF 208 receives the target information provided by the LEA 231 and generates the related target list, encrypting them before the injection towards the LI-SWM 207.

Message 655

OpenInjectionChannelRequest( ) is transmitted from the ADMF 208 to the NE 201.

Message 657

OpenInjectionChannelResponse(success) is transmitted from the NE 201 to the ADMF 208.

Message 659

InjectionChannelTransfer( ) i.e. an injection message containing the target list, is transmitted from the ADMF 208 to the NE 201.

Action 661

The target list that is received is stored in the protected memory area 205, e.g. within the LI-SWM 207.

Message 663

InjectionResponse(channel closure) is transmitted from the NE 201 to the ADMF 208.

As noted above, although not illustrated, some embodiments include further detailed actions involving handshaking and retry mechanisms between the communicating entities.

Figure 7:
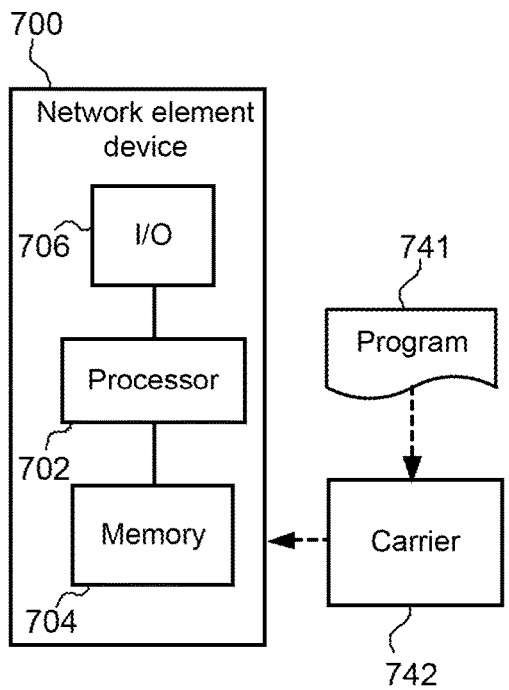

Turning now to FIG. 7, and with continued reference to FIGS. 1 to 6, a network element (NE) device 700, which may correspond to the NE 201 described above, will be described in some detail. The network element device 700 comprises a processor 702 and a memory 704. The memory 704 contains instructions executable by the processor 702 whereby the network element device 700 is operative to:
  obtain, from a lawful interception, LI, function 208 a lawful interception software module (LI-SWM) 207 that is configured to perform LI of user traffic handled by the NE device 700,
  store the LI-SWM 207 in a memory area 205 that is protected from unauthorized access, and
  execute the LI-SWM 207, comprising LI of user traffic handled by the NE device 700.

The instructions that are executable by the processor 702 may be software in the form of a computer program 741. The computer program 741 may be contained in or by a carrier 742, which may provide the computer program 741 to the memory 704 and processor 702. The carrier 742 may be in any suitable form including an electronic signal, an optical signal, a radio signal or a computer readable storage medium.

In some embodiments, the NE device 700 is operative to:
  obtain, from the LI function 208, target information,
  store the target information in the protected memory area 205, and operative such that:
  the executing of the LI-SWM 207 comprises utilization of the target information.

In some embodiments, the NE device 700 is operative such that any of the obtaining of the LI-SWM and the obtaining of the target information comprises reception via an injection channel between the LI function 208 and the NE device 700.

In some embodiments, the NE device 700 is operative to:
  receive, from the LI function 208, a request for opening an injection channel between the LI function 208 and the NE device 700,
  transmit, to the LI function 208, a confirmation that the injection channel is open,
  receive any of the LI-SWM 207 and the target information via the injection channel, and
  transmit, to the LI function 208, a request to close the injection channel.

In some embodiments, the NE device 700 is operative such that the receiving and transmitting are performed via an X1 interface between the LI function 208 and the NE device 700.

In some embodiments, the NE device 700 is operative such that the stored target information is in the form of stored encrypted target information and operative such that the executing of the LI-SWM 207 comprises:
  receiving a replicated data traffic packet,
  extracting target information from the replicated data traffic packet,
  encrypting the extracted target information,
  comparing the extracted and encrypted target information with the stored encrypted target information, and
  if the comparing results in a match between the extracted and encrypted target information with the stored encrypted target information, conveying the replicated data traffic packet to a LI mediation and delivery function, MF/DF 232,
  if the comparing results in a mismatch between the extracted and encrypted target information with the stored encrypted target information, discarding the replicated data traffic packet.

Figure 8:
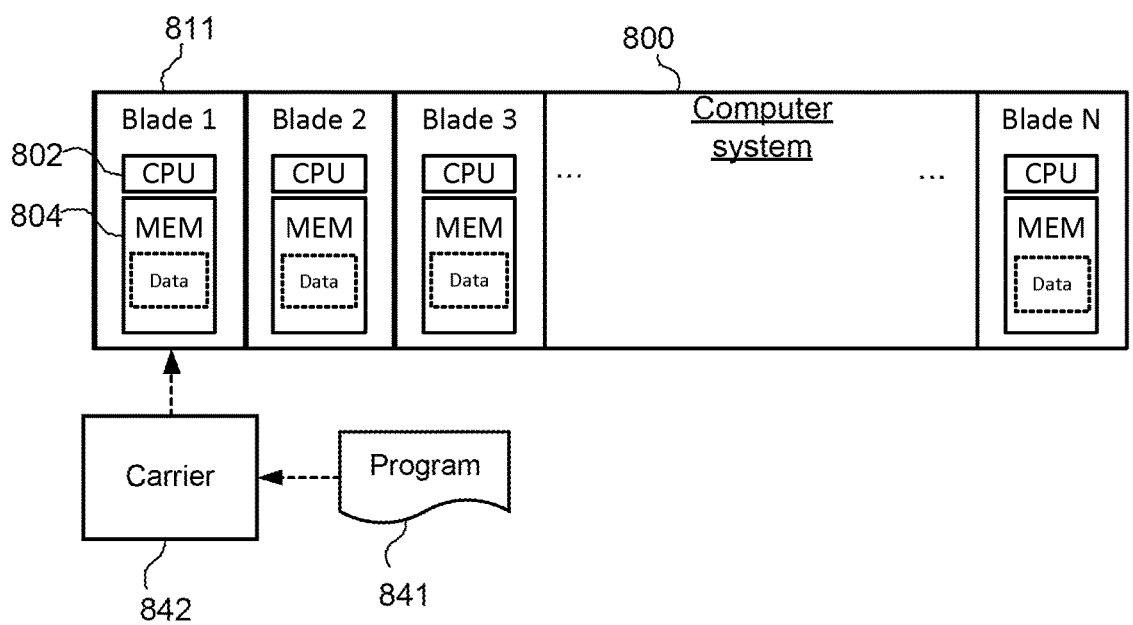

Turning now to FIG. 8, and with continued reference to FIGS. 1 to 6, a computer system 800 will be described in some detail. The computer system 800, which may correspond to at least part of the network 100, comprises a plurality of server blades 811 that comprise a processor 802 and a memory 804. The memory 804 contains instructions executable by the processor 802 whereby the computer system 800 is operative to:
  provide, to a network element (NE) 201, 700 a lawful interception software module (LI-SWM) 207 that is configured to perform LI of user traffic handled by the NE 201, 700.

The instructions that are executable by the processor 802 may be software in the form of a computer program 841. The computer program 841 may be contained in or by a carrier 782, which may provide the computer program 841 to the memory 804 and processor 802. The carrier 842 may be in any suitable form including an electronic signal, an optical signal, a radio signal or a computer readable storage medium.

In some embodiments, the computer system 800 is operative to provide, to the NE 201, 700, target information.

In some embodiments, the computer system 800 is operative such that any of the providing of the LI-SWM 207 and the providing of the target information comprises transmission via an injection channel between the computer system 800 and the NE 201, 700.

In some embodiments, the computer system 800 is operative to:
  transmit, to the NE 201, 700, a request for opening an injection channel between the LI function 208 and the NE 201, 700,
  receive, from the NE 201, 700, a confirmation that the injection channel is open,
  transmit any of the LI-SWM 207 and the target information via the injection channel, and
  receive, from the NE 201, 700, a request to close the injection channel.

In some embodiments, the computer system 800 is operative such that the transmission and receiving are performed via an X1 interface between the computer system 800 and the NE 201, 700.

In some embodiments, the computer system 800 is operative as a LI administrative function (ADMF).

Figure 9:
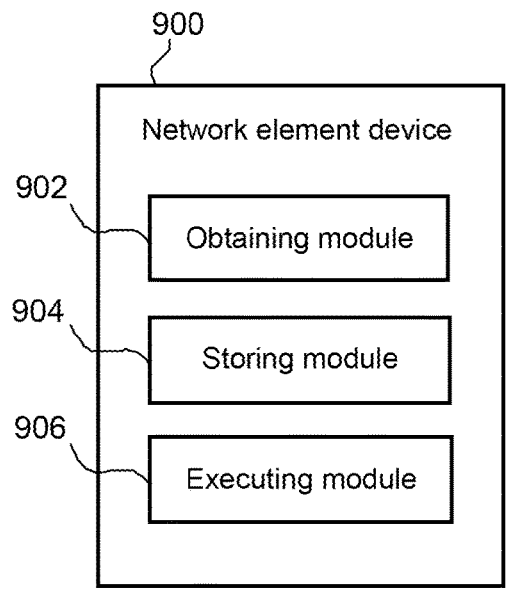

Turning now to FIG. 9, and with continued reference to FIGS. 1 to 6, a network element (NE) device 900 will be described in some detail. The NE device 900 comprises:

- an obtaining module 902 configured to obtain, from a lawful interception (LI) function 208 a lawful interception software module (LI-SWM) 207 that is configured to perform LI of user traffic handled by the NE device 900,
- a storing module 904 configured to store the LI-SWM 207 in a memory area that is protected from unauthorized access, and
- an executing module 906 configured to execute the LI-SWM 207, comprising LI of user traffic handled by the NE device 900.

The NE device 900 may comprise further modules that are configured to perform in a similar manner as, e.g., the NE device 700 described above in connection with FIG. 7.

The invention claimed is:

1. A method performed by a network element, NE, in a communication network, the method comprising:
   - receiving via an X1 interface between a lawful interception, LI, function and the NE, from the LI function, a request for opening an injection channel between the LI function and the NE;
   - transmitting via the X1 interface to the LI function, a confirmation that the injection channel is open;
   - receiving a lawful interception software module, LI-SWM, via the injection channel via the X1 interface, the LI-SWM being configured to perform LI of user traffic handled by the NE;
   - transmitting via the x1 interface, to the LI function, a request to close the injection channel;
   - storing the LI-SWM in a memory area that is protected from unauthorized access; and
   - executing the LI-SWM, comprising LI of user traffic handled by the NE.

2. The method of claim 1, comprising:
   - obtaining, from the LI function, target information,
   - storing the target information in the protected memory area, and wherein the executing (305) of the LI-SWM comprises utilization of the target information.

3. The method of claim 2, wherein the stored target information is in the form of stored encrypted target information and the executing of the LI-SWM comprises:
   - receiving a replicated data traffic packet,
   - extracting target information from the replicated data traffic packet,
   - encrypting the extracted target information,
   - comparing the extracted and encrypted target information with the stored encrypted target information, and
   - if the comparing results in a match between the extracted and encrypted target information with the stored encrypted target information, conveying the replicated data traffic packet to a LI mediation and delivery function, MF/DF,
   - if the comparing results in a mismatch between the extracted and encrypted target information with the stored encrypted target information, discarding the replicated data traffic packet.

4. The method of claim 1, wherein the obtaining of the target information comprises reception via the injection channel between the LI function and the NE.

5. The method of claim 1, wherein the L1 function is an L1 administrative function, ADMF.

6. A network element device comprising a processor and a memory, said memory containing instructions executable by said processor whereby said network element device is operative to perform a method according to claim 1.

7. A method performed by a lawful interception, LI, function in a communication network, the method comprising:
   - transmitting to a network element, NE, via an X1 interface between the LI function and the NE, a request for Opening an injection channel between the LI function and the NE;
   - receiving from the NE, via the X1 interface, a confirmation that the injection channel is open;
   - transmitting, via the X1 interface and via the injection channel, a lawful interception software module, LI-SWM, that is configured to perform LI of user traffic handled by the NE;
   - receiving from the NE via the X1 interface, a request to close the injection channel.

8. The method of claim 7, comprising:
   - providing target information via the injection channel, to the NE, target information.

9. The method of claim 7, wherein the LI function is an LI administrative function, ADMF.

10. A non-transitory computer readable storage medium comprising a computer program which comprises instructions which, when executed on at least one processor in a server blade in a computer system, cause the computer system to carry out the method according to claim 7.

* * * * *